United States Patent [19]
Bies et al.

[11] Patent Number: 5,736,045
[45] Date of Patent: Apr. 7, 1998

[54] FILTER ELEMENT WITH SUPPORT BODY

[75] Inventors: Peter Bies, Saarlouis; Artur Jung, Quierschied; Michael Sakranchinsky, St. Ingbert; Jurgen Hausdorf, Saarbrucken, all of Germany

[73] Assignee: HYDAC Filtertechnik GmbH, Sulzbach/Saar, Germany

[21] Appl. No.: 704,746

[22] PCT Filed: Dec. 5, 1994

[86] PCT No.: PCT/EP94/04045

§ 371 Date: Sep. 10, 1996

§ 102(e) Date: Sep. 10, 1996

[87] PCT Pub. No.: WO95/25577

PCT Pub. Date: Sep. 28, 1995

[30] Foreign Application Priority Data

Mar. 23, 1994 [DE] Germany .............. 44 09 970.3

[51] Int. Cl.$^6$ .................................................. B01D 29/15
[52] U.S. Cl. ............... 210/497.01; 210/499; 55/500; 55/501; 55/502
[58] Field of Search .............. 210/497.01, 497.2, 210/499, 322, 323.1, 323.2; 55/500, 501, 502

[56] References Cited

U.S. PATENT DOCUMENTS

| 4,526,688 | 7/1985 | Schmidt, Jr. et al. | 210/497.01 |
| 5,118,421 | 6/1992 | Scarano | 210/499 |
| 5,223,134 | 6/1993 | Riva | 210/497.01 |
| 5,308,485 | 5/1994 | Griffin et al. | 210/497.01 |

FOREIGN PATENT DOCUMENTS

| 0414336 | 2/1991 | European Pat. Off. |
| 2608618 | 9/1977 | Germany . |
| 3238783 | 7/1983 | Germany . |
| 3818595 | 7/1989 | Germany . |
| 8901358 | 2/1989 | WIPO . |

*Primary Examiner*—W. L. Walker
*Attorney, Agent, or Firm*—Roylance,Abrams,Berdo & Goodman, L.L.P.

[57] ABSTRACT

A filter element has a support member with a support tube which can abut a filter mat and which is provided with apertures for the passage of a filtered medium. The apertures are formed by the axial spaces between individual rings of the support member. The rings are supported by support walls dividing the interior of the support tube into individual chambers. Since the support member is rendered compression-stiff, it exclusively supports the filter mat when the medium flows through. The respective support wall is directly connected to the rings. Each ring with its closed annular shape surrounds the support walls on the exterior. The filtration capacity of filter elements can be improved and the weight and cost simultaneously reduced owing to the highly stable and compression-stiff support member.

20 Claims, 3 Drawing Sheets

FILTER ELEMENT WITH SUPPORT BODY

FIELD OF THE INVENTION

The present invention relates to filter element with a support body incorporating a support tube which can engage a filter mat and which is provided with apertures for the flowthrough of a filtered medium. The apertures are formed by the axial spacings between separate rings of the support body. The rings are supported by support walls. The support walls subdivide the interior of the support tube into separate chambers.

BACKGROUND OF THE INVENTION

The structure of the filter elements varies from manufacturer to manufacturer. In the case of simple filter elements constructed of paper, the filter mats are manufactured without the supporting wire gauze. With greater pressure differentials on the filter elements, the filter folds can be pressed together, causing a part of the filter material to remain unused for filtration.

Higher quality elements have a multilayer mat construction. The mat is pleated or folded to increase the effective filtration surface. Thus, the filter mat, which may also be called the filter fleece, is not pressed together during high pressure differentials. A support body is provided in the higher quality elements, generally in the form of a support tube, on which the fluid-permeable filter mat can be supported by a suitable mounting. The dimensions of the apertures in the support tube are determined such that the filter gauze of the filter mat cannot be pressed into the apertures, which could negatively influence the filtration performance.

A portion of the support body used until this time for filter elements has a solid support tube of metal produced from a flat blank. A noble metal or galvanized steel is used to maintain corrosion protection. The support tube has circular holes, each in the form of a borehole, forming the apertures. Generally, the support tube is arranged in the flowthrough direction of the fluid behind the filter mat. In this manner, the relevant apertures serve for flowthrough of the already filtered medium, generally filtered hydraulic oil. In the known supporting bodies, the entire arrangement is made accessible. The holes forming the flowthrough surface are relatively limited, and the supporting surface is relatively extensive. This arrangement yields a good support of the filter mat. However, the flowthrough is inhibited, and consequently, the filtration performance is limited. The manufacture of the metal support tube in the form of a hollow cylinder having circular apertures is costly, and therefore, expensive to manufacture. Furthermore, because of the solid construction of the known support bodies, the filter element is likewise heavy, which is particularly disadvantageous with filter elements of large structure.

A filter element with a support body constructed of lengthwise and transverse rods, generally forming meshed grid, is disclosed in German Patent. No. 32 38 783. The grid forms the apertures and is supported on a cylinder carrying body constructed comparable to the support tubes in the known filter elements. In the traditional filtration flow direction, from the outside to the inside, this filter element has a filter mantle as a filter mat supported on the support tube. The support tube is supported in turn on the carrying body or carrying tube, which likewise is provided with apertures.

To attain further reinforcement of this supporting and carrying structure, within the carrying body and connected with it, four diametrically oppositely arranged support walls are provided. Two support walls are always connected with each other with a circular segment, and are arranged offset at an angle from one another and with axial spacing from one another, forming a generally helical line within the joint. The carrying body is formed as the metal support tubes used until this time. The support body is formed of plastic material in the form of polypropyhlene. The mesh grid of the support body, formed of longitudinal and transverse ribs, has burled elevations, facing at least outward. The filter mantle is set in operation Such that at these points a thin filter cake segment is maintained. The filter cake is easily broken up upon reverse circulation of the filter element such that the filter mantle is cleaned effectively. For an effective support, this known filter element with support body requires two parts arranged coaxial to each other, tubular supporting and carrying bodies, which makes the known filter element expensive to manufacture and very heavy in weight.

European Patent A-0 414 336 describes a filter element with the supporting tube having rings held individually with axial spacing. These rings are, with reinforcement rods, arranged as desired within or outside the supporting body and are connected securely by means of a weld connection or through a separate fastening device. The reinforcement rods, preferably of metal, have a circular cross-section and leave large passage surfaces free for the fluid to be filtered between the rings. The reinforcement rods nonetheless allow no fluid guide within the hollow cylindrical support body for the fluid. Thus, influenced by vorticity and by the flow resistances which are thereby generated, the free passage is impeded and the advantage of the larger passage surfaces becomes ineffective.

SUMMARY OF THE INVENTION

Objects of the present invention are to provide a filter element with a very stable and pressure resistant supporting body, with improved filtration performance and with weight and cost reductions.

The foregoing objects are attained by a filter element, comprising a support body having a support tube with a plurality of axially spaced closed rings defining apertures therebetween for flowing filter medium therethrough and with a longitudinal axis. A filter mat is engaged with the support tube. Support walls subdivide an interior of the support tube into separate chambers and are directly connected on outer peripheries thereof with the rings to support the rings such that the rings surround the support walls and resist pressures during flow of medium through the filter mat. The support walls have surfaces extending completely through the support tube and are aligned with the longitudinal axis. Reinforcement rods are connected with the rings, extend completely through the support tube parallel to the longitudinal axis, have substantially rectangular transverse cross-sectional configurations, are equidistant from one another and the support walls along the rings, and project radially at least partially into the chambers.

The foregoing objects are also basically obtained by a filter element comprising a support body having a support tube with a plurality of axially spaced closed rings defining apertures therebetween for flowing filtered medium therethrough and with a longitudinal axis. A filter mat is engaged with the support tube. Support walls subdivide an interior of the support tube into separate chambers and are directly connected on outer peripheries thereof with the rings to support the rings such that the rings surround the support walls and resist pressure during flow of medium through the filter mat. The support walls have surfaces extending completely through the support tube and aligned with the longitudinal axis. Reinforcement rods are connected with the rings and extend completely through the support tube parallel to the longitudinal axis. The reinforcement rods are arranged in groups of three between each adjacent pair of support walls. Each group has a middle reinforcement rod with a larger transverse cross-sectional area than the other reinforcement rods of that group.

By using the present invention, very considerable flowthrough surface is available in the segments between the rings, while simultaneously providing very good support of the filter mat. This lowers the flowthrough resistance, and consequently, increases the filtration performance of the filter element.

Interior support of the closed rings by direct connection with the support walls and in position to provide reinforcement permits both the rings and the support walls, as well as the inserted reinforcements, in an arrangement using very little space and very little material. However, high resistance for the support body results so that secure support of the filter mat on the support body is guaranteed. The filtration performance is not inhibited when the support walls mounted in the interior of the support tube subdivide this tube into separate chambers or segments. For the fluid flow after passage through the apertures into the interior of the support body, a favorable channel guide is formed.

Otherwise, traditional solutions are still provided for the support body. By having a plurality of closed rings in a sort of separate structure part from the inside out, the support walls and the reinforcement rods or inserts provide a construction which offers a multiple reinforcement as compared with known solutions. The filter element with its support body according to the present invention forms not only a pressure-resistant construction, but, because of the ring structure, has a low number of parts which can provide a low cost of manufacture to lower the manufacturing costs for a filter element.

The advantages of the filter element with support body according to the present invention are particularly evident when compared with conventional devices having a body of metal manufactured by a die casting method, or preferably of plastic by a plastic injection molding method. The use of plastic with its lower weight, as compared to the known metal constructions, for the support body surprisingly provides resistance levels which are sufficient. Even with high pressure peaks and changing volume flows of the medium, the filter mat is securely supported. With corresponding reinforcement of the rings by the support walls extending in the interior of the support body, deformations do not cause damage. Additionally, dependent upon the plastic material being used, its elasticity after removal of the load permits a return to shape and the original tubular structure of the support body.

Advantageously, three support walls can be provided which are connected along the longitudinal axis of the support tube. Two adjacent support walls form an angle of 120 degrees with one another. With this construction of the support walls as a three-legged structure, less material provides high resistance values for supporting the ring structure.

In one especially preferred embodiment of the support body of the present invention, the reinforcement rods are rectangular in cross-section, are equidistant from one another and the support walls, and are all arranged on the support walls alongside the rings to project at least partially into the interior of the chambers. The reinforcement rods form a sort of transverse beam, which can be attached to the end of the support body. Then the rings arranged in the support body essentially in the middle support the filter mats when they are at higher stress. Preferably, between each two adjacent support walls three reinforcement rods form a group. In the case of high stresses, the middle reinforcement rod of a group of three can have a larger transverse cross-sectional rod area than the other rods of the group. In addition to the rectangular cross section for a reinforcement rod, other cross-sectional shapes could also be used, especially such dimensions which in the load torque direction embody a high resistance torque.

In another preferred embodiment of the support body of the present invention, the reinforcement rods are tapered longitudinally along the support body adjacent their ends. In this case, defined gripping or chucking points for the individual transverse beams are obtained.

In another preferred embodiment of the support body according to the present invention, at least the support tube is of plastic which can be processed in a plastic injection molding process. The plastic for the support tube can be at least partially electrically conductive, and especially of carbon material, or coated with carbon material. By this means, electrostatic surges can be avoided, especially when the support tube has a non-electrically conductive liquid flowing through it.

In one especially preferred embodiment of the support body according to the present invention, the support tube is provided with annular protection caps on the ends. The caps can hold the filter mat. The interior of the support tube in relation to the surrounding environment can be sealed by means of a sealant. An easily manipulable structural unit is thereby attained, which can be used directly in a filter housing or the like.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 4:
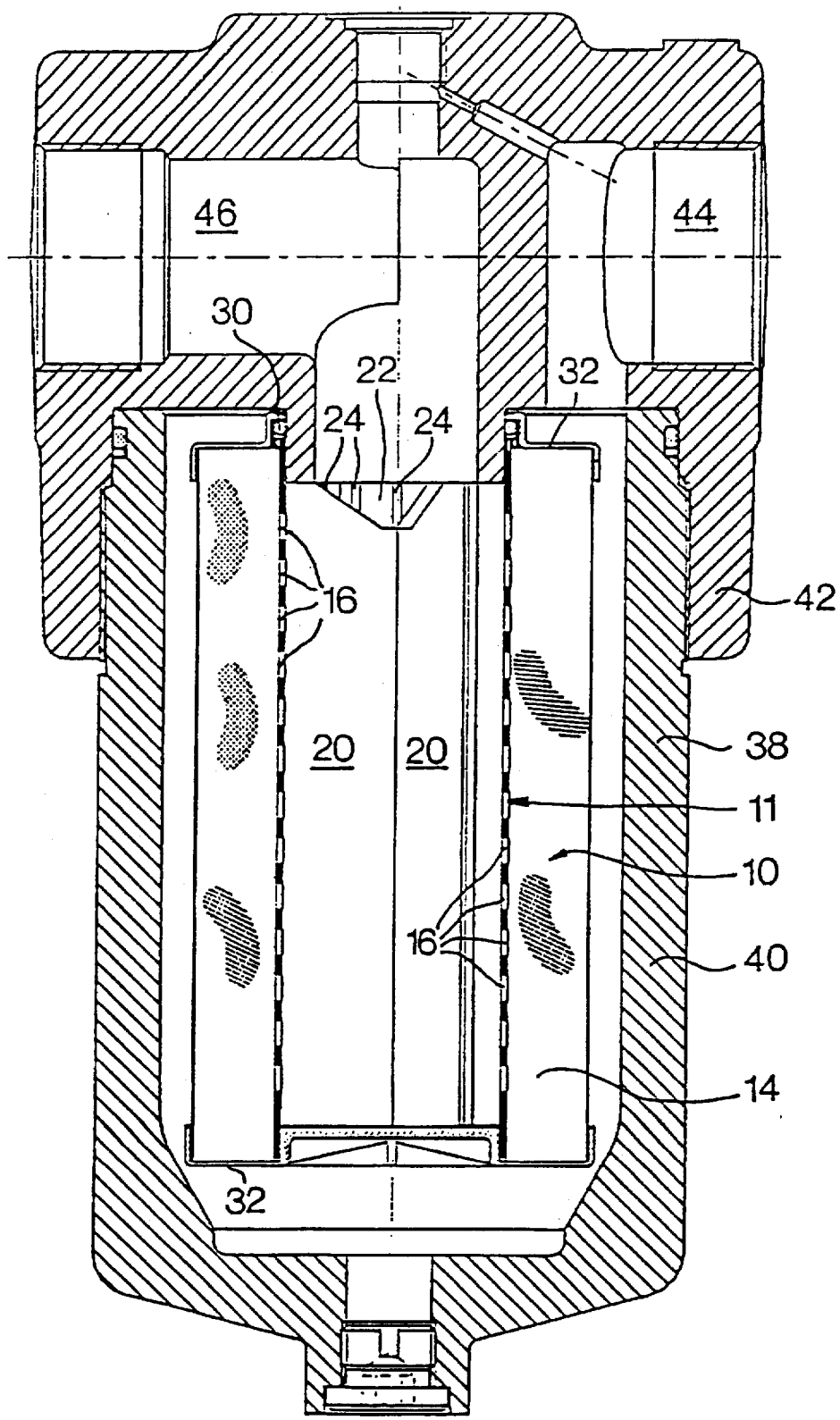
FIG. 4 is a side elevational view in section of a filter housing holding a filter element according to the present invention.

The support body 11, for a filter element 10 in FIG. 4 has a support tube 12. Tube 12 can be brought into engagement with a filter mat 14 for filtering of a polluted medium, especially a liquid such as hydraulic oil. Support tube 12 is provided with apertures 16 for the flowthrough of the medium filtered by filter mat 14. For simplicity, not all of the apertures are indicated with reference number 16 in the drawing.

With the formation of apertures 16, support tube 12 has individual rings 18 having a predetermined axial spacing from one another. All rings 18 are also precisely configured essentially identical to one another in terms of their width. Closed rings 18 are mounted on support walls 20, surround these walls from their outside surfaces and are connected securely therewith. These support walls 20 subdivide the interior of support tube 12 into separate chambers 22. Support walls 20 form surfaces passing all the way through. As shown particularly in FIGS. 1 and 2, reinforcement rods 24 are provided in the form of transverse beams between support walls 20 and connected with rings 18. Both support walls 20 and reinforcement rods 24 extend all the way through support tube 12 in its longitudinal direction.

In the illustrated embodiment of support body 11 according to the present invention, three support walls 20 and also three chambers 22 are provided. The three support walls 20 are connected with one another along the longitudinal axis of support tube 12. Two adjacent support walls 20 define an angle of approximately 120 degrees. A recess or opening can also be present in the longitudinal axis of support tube 12, forming a longitudinal borehole of a modified embodiment of support body 11. The widening of the connection point between support walls 20 can add to the level of resistance of the entire construction.

Figure 1:
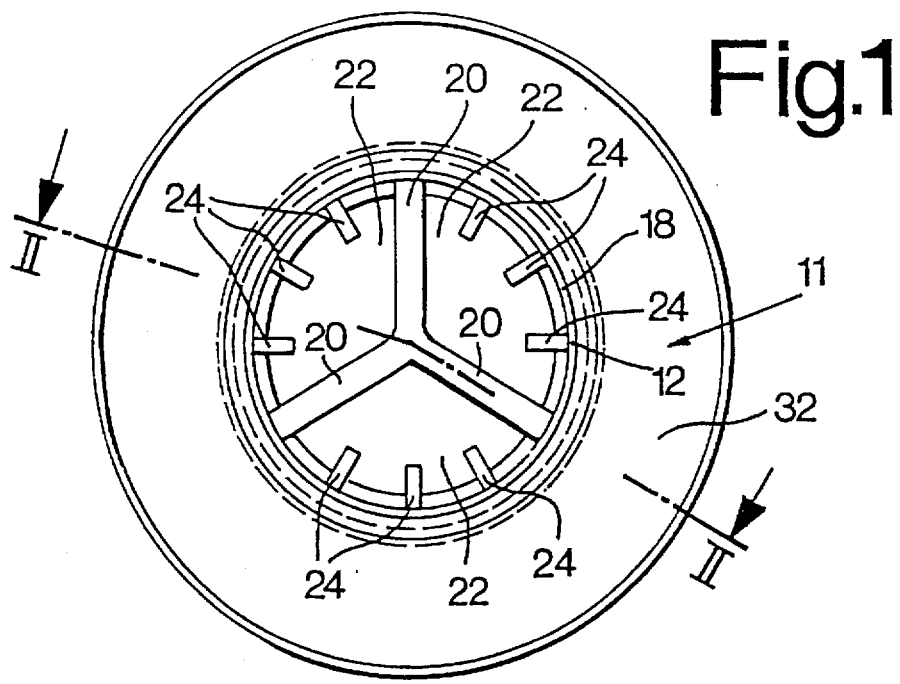
FIG. 1 is a top plan view of the support tube with a protection cap placed on it according to a first embodiment of the present invention.

As shown especially in FIG. 1, the individual reinforcement rods 24 are rectangular in transverse cross-sectional configuration, are arranged equidistant from one another and from the support walls 20, and are distributed around the interior peripheries of rings 18. The reinforcement rods 24 project radially partially into the interior of the chambers 22 associated therewith. Between each two adjacent support walls 20, three reinforcement rods 24 are provided in a group.

Figure 2:
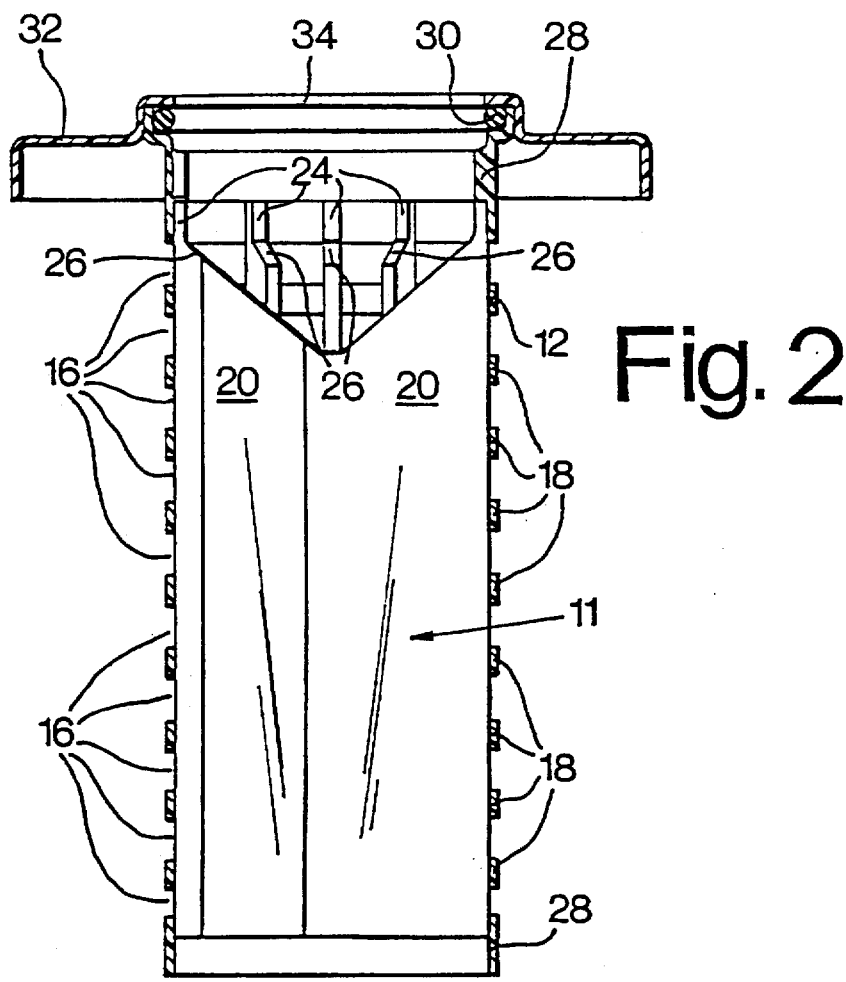
FIG. 2 is a partial side elevational view, partially in cross-section, along line II—II of FIG. 1.
Figure 3:
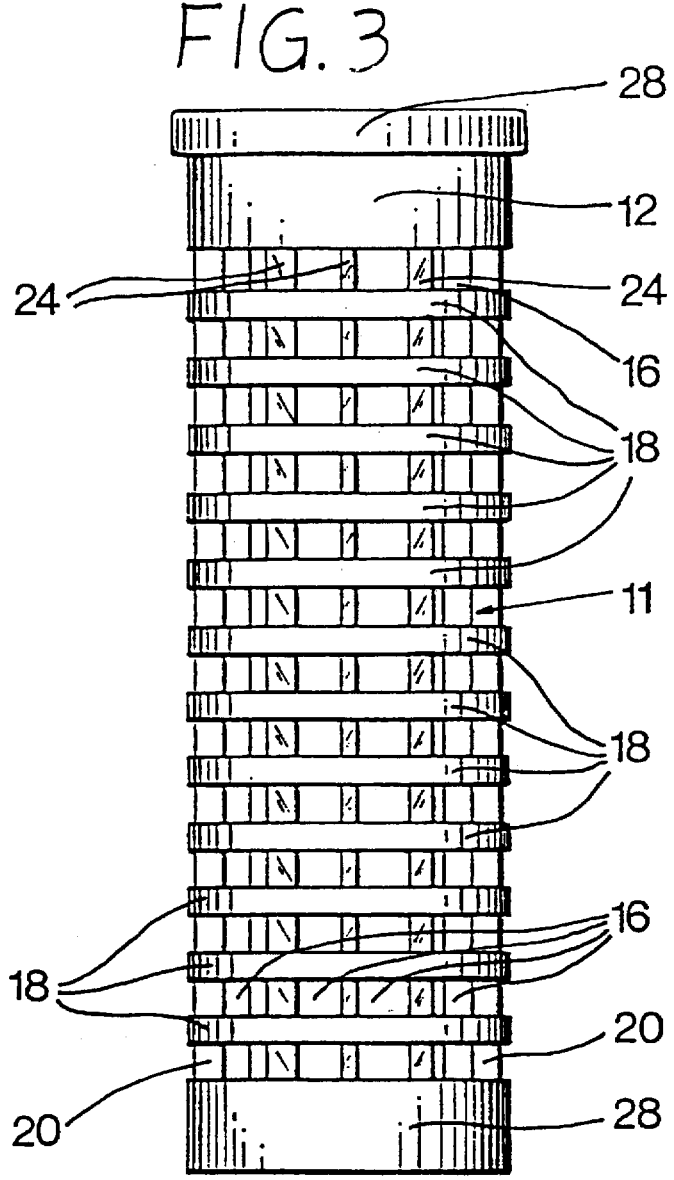
FIG. 3 is a side elevational view of the support tube of FIG. 1.
Figure 3A:
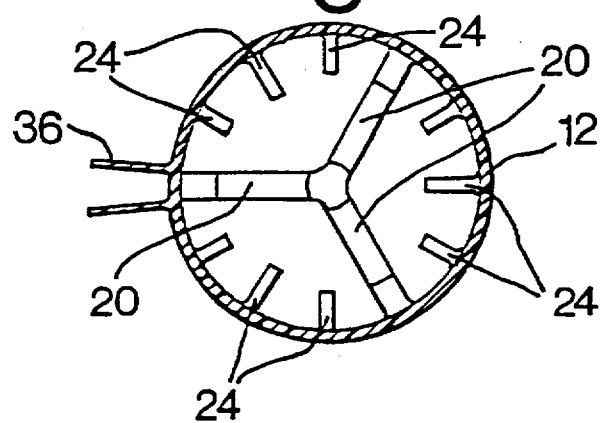
FIG. 3a is a top plan view of a support tube according to a second embodiment of the present invention.

As especially evident in a modified embodiment shown in FIG. 3a, the middle reinforcement rod 24 of each group of three reinforcement rods can have a larger rod transverse cross-sectional area than the two other adjacent rods 24 of this same group to increase the flex resistance to torque. As shown in FIG. 2, reinforcement rods 24 are in longitudinal alignment along support body 12, and are reduced in transverse cross-section toward their ends, providing a beveling 26 at the point of the transverse section conversion.

At the points of this reduced cross-section, reinforcement rods 24 are, in turn, radially surrounded at their ends by a cylindrical protection member 28. Protection member 28 is arranged at the top, as seen in FIG. 4, and receives a sealing means in the form of an O-ring 30 on its free end within a radial widening. This radial widening, with the sealing ring 30 held therein, is covered with a protection cap 32 in the form of a cover. Cap 32 has a ring configuration and a circular cutout 34 in its middle for fluid passage. In the illustration of FIG. 2, only one protection cap 32 is shown. However, if the other end of support tube 12 with its protection member 28, as in the drawing of FIG. 4, is likewise provided with a protection cap 32, a receiver is formed to hold the annular filter mat 14 between the two protective caps 32. For this arrangement for fastening filter mat 14, protection caps 32 have offset flanges on their sides extending toward one another. To simply apply filter mat to support tube 12, support tube 12 can be provided with a U-shaped or V-shaped strip 36 (see FIG. 3a) extending in a longitudinal direction in which the ends of filter mat 14 can be introduced and turned toward one another for secure fastening.

Support body 11 With support tube 12, protection caps 32 and filter mat 14 form the entirety of filter element 10. Filter element 10 can be inserted into a filter housing 38 as a structural unit. Filter housing 38, shown in FIG. 4, comprises two filter housing parts 40 and 42. For interchange of the filter element, the bottom housing part 40 can be screwed off top housing part 42. Top housing part 42 has a feed port 44, as well as a discharge port 46. The unfiltered medium enters through feed port 44 and passes into bottom housing part 40, where it flows from outside the filter element into the interior of filter element 10. By this means, the medium is cleaned. Subsequently, the cleaned medium passes through inner chambers 22 of support tube 12 to discharge port 46 to exit housing 38.

Support tube 12, with its three rods and support walls 20, is preferably manufactured by a plastic injection molding method. If greater reinforcement is required, more rods in the form of additional support walls can be provided in separate unit form and can be arranged in the interior of the support body.

The tool for production of the support body in the plastic injection molding method comprises essentially two shells. Rings 18 and the complete outside form of the support body are formed in mirror image in one half-shell. On the side of the support body on which the O-ring 30 can be mounted, the tool also has a short molded core. The short molded core, in mirror image, forms the annular groove for the O-ring 320 as well as the adjacent protection member 28 (called a keyport-closing). A longer molded core of the tool, comprising individual strips which subsequently form support walls 20 and reinforcement rods 24, consequently forms the complete interior contour of support body 11 in mirror image to the tool part. When the tool is pressed together, the longer molded core engages into the short molded core to provide the guiding.

Basically, any plastic can be used which is suitable for injection molding. This plastic can also be electrically conductive, if support tube 12 has a non-electrically conductive liquid flowing through it for a filtration process and the danger of static charges for filter element 10 exists.

While the various embodiments have been chosen to illustrate the invention, it will be understood by those skilled in the art that various changes and modifications can be made therein without departing from the scope of the invention as defined in the appended claims.

We claim:

1. A filter element, comprising:

a support body having a support tube with a plurality of axially spaced, closed rings defining apertures therebetween for flowing filtered medium therethrough and with a longitudinal axis;

a filter mat engaged with said support tube;

support walls subdividing an interior of said support tube into separate chambers and being directly connected on outer peripheries thereof with said rings to support said rings such that said rings surround said support walls and resist pressures during flow of medium through said filter mat, said support walls having surfaces extending completely through said support tube and being aligned with said longitudinal axis; and reinforcement rods being connected with said rings, extending completely through said support tube parallel to said longitudinal axis, having substantially rectangular transverse cross-sectional configurations, being equidistant from one another and said support walls along said rings and projecting radially at least partially into said chambers.

2. A filter element according to claim 1 wherein three of said support walls are provided and are connected with one another along said longitudinal axis, each adjacent pair of said support walls forming an angle of substantially 120 degrees therebetween.

3. A filter element according to claim 2 wherein said reinforcement rods are arranged in groups of three between each adjacent pair of said support walls.

4. A filter element according to claim 1 wherein said reinforcement rods are arranged in groups of three between each adjacent pair of said support walls.

5. A filter element according to claim 4 wherein each of said groups comprises a middle one of said reinforcement rods with a larger transverse cross-sectional area than the other reinforcement rods of that group.

6. A filter element according to claim 3 wherein each of said groups comprises a middle one of said reinforcement rods with a larger transverse cross-sectional area than the other reinforcement rods of that group.

7. A filter element according to claim 1 wherein said reinforcement rods have longitudinal ends with smaller transverse cross-sectional areas than portions thereof spaced from said ends.

8. A filter element according to claim 1 wherein said support tube is made of plastic which can be injection molded.

9. A filter element according to claim 8 wherein said plastic is at least partially electrically conductive.

10. A filter element according to claim 9 wherein said plastic is coated with carbon material.

11. A filter element according to claim 1 wherein said support tube comprises an annular protection cap on at least one longitudinal end thereof and sealing means for sealing said interior thereof from a surrounding environment.

12. A filter element according to claim 1 wherein said support tube comprises annular protection caps on longitudinal ends thereof, and sealing means for sealing an interior thereof from a surrounding environment.

13. A filter element, comprising:

support body having a support tube with a plurality of axially spaced, closed rings defining apertures therebetween for flowing filtered medium therethrough and with a longitudinal axis;

a filter mat engaged with said support tube;

support walls subdividing an interior of said support tube into separate chambers and being directly connected on outer peripheries thereof with said rings to support said rings such that said rings surround said support walls and resist pressures during flow of medium through said filter mat, said support walls having surfaces extending completely through said support tube and being aligned with said longitudinal axis; and reinforcement rods being connected with said rings and extending completely through said support tube parallel to said longitudinal axis, said reinforcement rods being arranged in groups of three between each adjacent pair of said support walls, each of said groups having a middle one of said reinforcement rods with a larger transverse cross-sectional area than the other reinforcement rods of that group.

14. A filter element according to claim 13 wherein three of said support walls are provided and are connected with one another along said longitudinal axis, each adjacent pair of said support walls forming an angle of substantially 120 degrees therebetween.

15. A filter element according to claim 13 wherein said reinforcement rods have longitudinal ends with smaller transverse cross-sectional areas than portions thereof spaced from said ends.

16. A filter element according to claim 13 wherein said support tube is made of plastic which can be injection molded.

17. A filter element according to claim 16 wherein said plastic is at least partially electrically conductive.

18. A filter element according to claim 17 wherein said plastic is coated with carbon material.

19. A filter element according to claim 13 wherein said support tube comprises an annular protection cap on at least one longitudinal end thereof and sealing means for sealing said interior thereof from a surrounding environment.

20. A filter element according to claim 13 wherein said support tube comprises annular protection caps on longitudinal ends thereof, and sealing means for sealing an interior thereof from a surrounding environment.

* * * * *